United States Patent
Davis

(10) Patent No.: US 11,458,541 B2
(45) Date of Patent: Oct. 4, 2022

(54) METHOD OF MANUFACTURING A COMPONENT

(71) Applicant: Siemens Energy Global GmbH & Co. KG, Munich (DE)

(72) Inventor: Anthony Davis, Bassingham (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 62 days.

(21) Appl. No.: 16/636,661

(22) PCT Filed: Sep. 3, 2018

(86) PCT No.: PCT/EP2018/073632
§ 371 (c)(1),
(2) Date: Feb. 5, 2020

(87) PCT Pub. No.: WO2019/043229
PCT Pub. Date: Mar. 7, 2019

(65) Prior Publication Data
US 2021/0146445 A1    May 20, 2021

(30) Foreign Application Priority Data
Sep. 4, 2017  (EP) .................. 17189186

(51) Int. Cl.
*B22F 5/04*     (2006.01)
*B22F 10/28*    (2021.01)
(Continued)

(52) U.S. Cl.
CPC ............ *B22F 10/28* (2021.01); *B22F 5/04* (2013.01); *B22F 10/38* (2021.01); *B22F 10/85* (2021.01);
(Continued)

(58) Field of Classification Search
CPC ..................................... B22F 10/28
See application file for complete search history.

(56) References Cited

U.S. PATENT DOCUMENTS 5,975,850 A * 11/1999 Abuaf .......... F01D 5/187
416/97 R
2001/0014403 A1    8/2001 Brown et al.
(Continued)

FOREIGN PATENT DOCUMENTS

CN    102116176 A    7/2011
CN    104662274 A    5/2015
(Continued)

OTHER PUBLICATIONS

International search report and written opinion dated Jan. 2, 2019 for corresponding PCT/EP2018/073632.

*Primary Examiner* — Monica A Huson
*Assistant Examiner* — Kelsey C Grace

(57) ABSTRACT

A method of manufacturing a component for a turbo machine. The component includes a main body having a fluid inlet and fluid outlet. A cooling passage extends between a fluid inlet and a fluid outlet. The cooling passage is divided into a first and a second section which extend between the fluid inlet and fluid outlet. The first section has a first predetermined roughness; and the second section has a second predetermined surface roughness; the predetermined surface roughness in at least one of the first section and second section is defined by a plurality of spaced apart micro ribs which extend at least part of the way across the cooling passage, at least one of the cooling passage sections is formed to further include macro ribs which extend across the cooling passage, at least one micro rib is being formed between adjacent macro ribs.

20 Claims, 5 Drawing Sheets

(51) Int. Cl.
*B33Y 80/00* (2015.01)
*B22F 10/85* (2021.01)
*B22F 12/41* (2021.01)
*B22F 10/38* (2021.01)
*B33Y 10/00* (2015.01)
*B33Y 50/02* (2015.01)

(52) U.S. Cl.
CPC .............. *B22F 12/41* (2021.01); *B33Y 80/00* (2014.12); *B33Y 10/00* (2014.12); *B33Y 50/02* (2014.12)

(56) References Cited

U.S. PATENT DOCUMENTS

| | | |
|---|---|---|
| 2011/0164981 A1 | 7/2011 | Hardwicke |
| 2013/0071562 A1* | 3/2013 | Szuromi ................. B22F 5/04 427/237 |
| 2016/0010863 A1* | 1/2016 | Ott ......................... B22F 10/20 428/141 |
| 2016/0052057 A1 | 2/2016 | Xu |
| 2016/0290139 A1 | 10/2016 | Snyder et al. |
| 2017/0292389 A1 | 10/2017 | Lorstad et al. |
| 2018/0045059 A1 | 2/2018 | Lee et al. |

FOREIGN PATENT DOCUMENTS

| | | |
|---|---|---|
| CN | 106715836 A | 5/2017 |
| CN | 107075955 A | 8/2017 |
| EP | 2570595 A1 | 3/2013 |
| EP | 2602439 A1 | 6/2013 |
| EP | 2975351 A1 | 1/2016 |
| WO | 0185386 A2 | 11/2001 |
| WO | 2014052323 A1 | 4/2014 |

\* cited by examiner

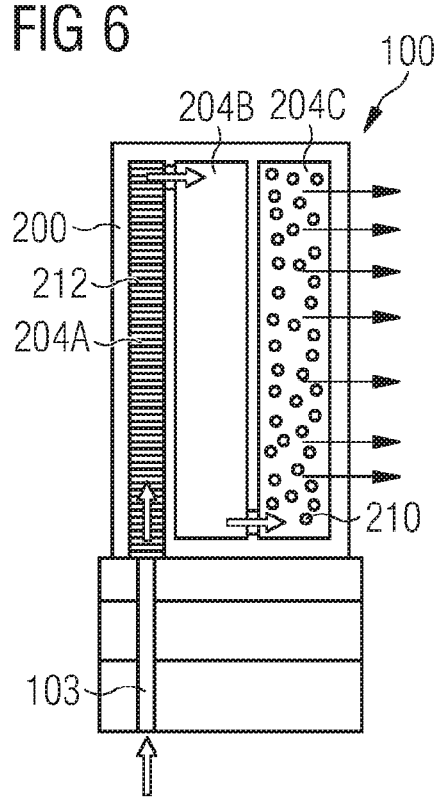
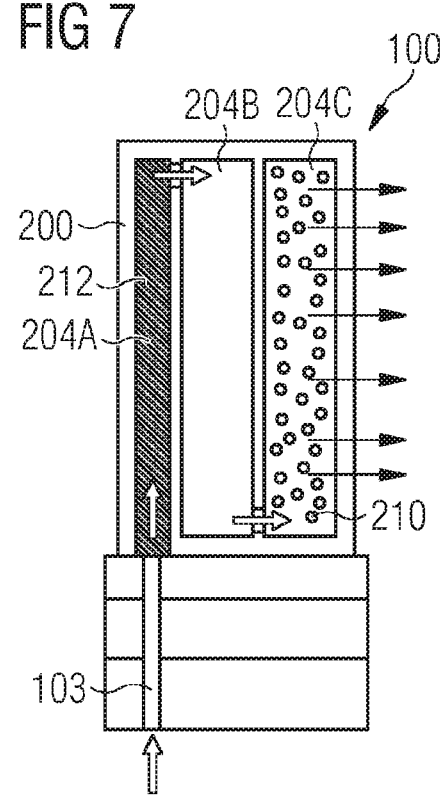
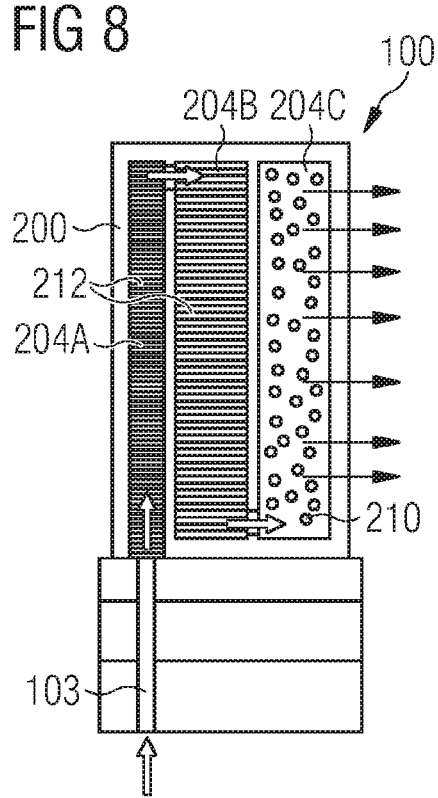
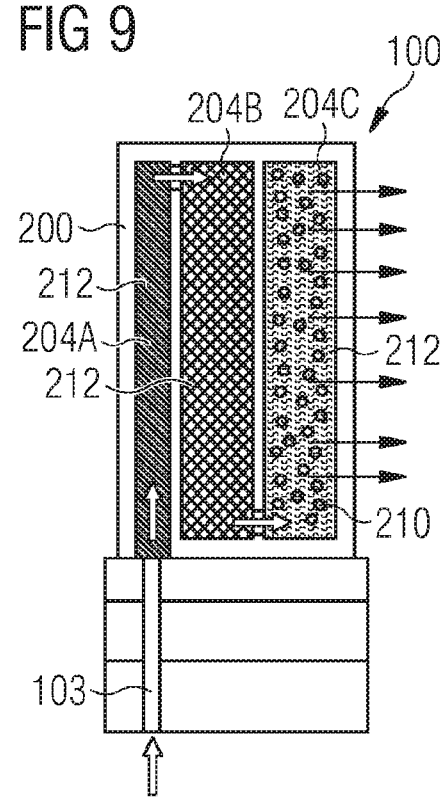

METHOD OF MANUFACTURING A COMPONENT

CROSS REFERENCE TO RELATED APPLICATIONS

This application is the US National Stage of International Application No. PCT/EP2018/073632 filed 3 Sep. 2018, and claims the benefit thereof. The International Application claims the benefit of European Application No. EP17189186 filed 4 Sep. 2017. All of the applications are incorporated by reference herein in their entirety.

FIELD OF INVENTION

The present disclosure relates to a method of manufacturing a component for a turbo machine.

In particular the present disclosure relates to the field of laser sintering for manufacturing an object.

BACKGROUND

Gas turbines generally include a rotor with a number of rows of rotating rotor blades which are fixed to a rotor shaft and rows of stationary vanes between the rows of rotor blades which are fixed to the casing of the gas turbine. When a hot and pressurized working fluid flows through the rows of vanes and blades it transfers momentum to the rotor blades and thus imparts a rotary motion to the rotor while expanding and cooling. The vanes are used to control the flow of the working medium so as to optimize momentum transfer to the rotor blades.

A typical gas turbine rotor blade comprises a root portion by which it is fixed to the rotor shaft, and an aerodynamically formed aerofoil portion which allows a transfer of momentum when the hot and pressurized working fluid flows along the aerofoil section.

Rotor blades tend to be hollow, for example comprising a plenum through which cooling air is forced. The plenum may be divided by internal walls which are formed integrally with the aerofoil structure.

As the components are usually made by the 'lost wax' casting method the surface finish of the internal passages which is smooth enough to have a negligible effect on the surface heat transfer. Typical cooling designs for nozzle guide vanes and turbine blades use turbulators (e.g. ribs, pins or pedestals) or impingement jets in various combinations to generate the necessary internal heat transfer.

However, such an arrangement may not provide a suitable level of cooling at all engine conditions, and hence may limit the maximum working temperature of the engine.

Hence a method of manufacturing a component to provide internal cooling passages configured for enhanced cooling highly desirable.

SUMMARY

According to the present disclosure there is provided a method as set forth in the appended claims. Other features of the invention will be apparent from the dependent claims, and the description which follows.

Accordingly there may be provided a method of manufacturing a component (100) for a turbo machine, the component (100) comprising: a main body (104) having a fluid inlet (103) and fluid outlet (200); a cooling passage (204) extending between a fluid inlet (103) and a fluid outlet (200); the cooling passage (204) divided into a first section (204A) and a second section (204B) which extend between the fluid inlet (103) and fluid outlet (200); the method comprising the steps of: manufacturing the component (100) using a laser sintering additive manufacture apparatus; controlling the laser sintering additive manufacture apparatus dependent on a control parameter such that the first section (204A) has a first predetermined roughness; and the second section (204B) has a second predetermined surface roughness; wherein the first predetermined surface roughness (Ra) is no less than about 7 µm but no more than about 15 µm.

The macro ribs may be formed to have a height X and the micro ribs may be formed to have a height Z and height Z is between 0.05X and 0.1X.

The macro ribs may be formed to have a pitch P between 6X and 10X, and the micro ribs may be formed to have a pitch between 6Z and 10Z.

The method may comprise the step of controlling the laser sintering additive manufacture apparatus to form the predetermined first surface roughness of the first section (204A) and the predetermined second surface roughness of the second section (204B) to have the same value.

The method may comprise the step of controlling the laser sintering additive manufacture apparatus to form the predetermined first surface roughness of the first section (204A) and the predetermined second surface roughness of the second section (204B) to have a different value.

The method may comprise the step of controlling the laser sintering additive manufacture apparatus such that the predetermined second surface roughness of the second section (204B) is no less than about 1.5 µm but no more than about 3.5 µm.

The control parameter may be tracking speed of the sintering laser (402).

The control parameter may be intensity of the sintering laser (402).

The control parameter may be spot size of the sintering laser (402).

The control parameter may be grain size of sintering material, the method comprising the step of controlling the supply of the sintering material.

The additive manufacturing apparatus may be controlled to produce a predetermined surface roughness in at least one of the first section (204A) and second section (204B) defined by a plurality of spaced apart micro ribs (212) which extend at least part of the way across the cooling passage (204), wherein the micro ribs (212) have a height and width of no less than 0.025 mm and no greater than 0.1 mm.

The micro ribs (212) may be formed to be polygonal in cross section.

At least one of the cooling passage (204) sections may be formed to further comprise macro ribs (206) which extend across the cooling passage (204), wherein the macro ribs (206) are formed to have a height and width of no less than 0.5 mm and no greater than 5 mm, at least one micro rib being formed between adjacent macro ribs (206).

The macro ribs (206) and micro ribs (212) may be formed to be parallel with one another.

The macro ribs (206) and micro ribs (212) may be formed to be at an angle to one another.

The component (100) formed by the apparatus is one of: a rotor blade (100), stator vane (96) or rotor disc (90).

Hence there is provided a method for making a component for a turbo machine, for example a gas turbine engine, wherein the component is configured to have a cooling passage with a predetermined surface roughness which, in use, increases heat transfer between the material of the component and fluid/air passing through the component.

BRIEF DESCRIPTION OF THE DRAWINGS

Examples of the present disclosure will now be described with reference to the accompanying drawings, in which:

FIGS. 6 to 10 show pictorial representations of different examples of rotor blade cooling passages configured according to the present disclosure.

DETAILED DESCRIPTION

The present invention relates to a method of manufacture of a component for a turbo machine, and the component. The turbo machine may be a gas turbine engine, and the component may be a rotor blade, stator vane or rotor disc.

Figure 1:
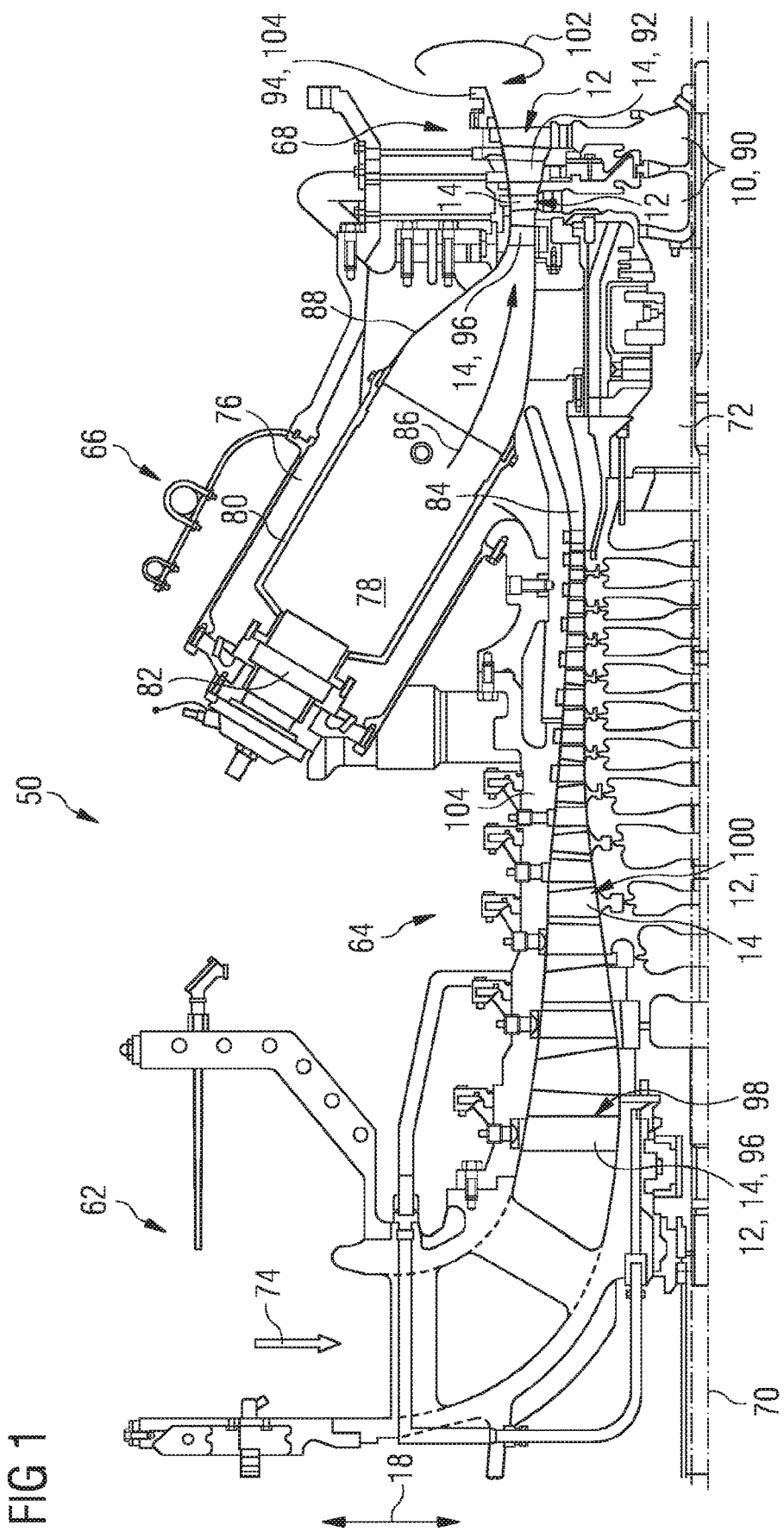
FIG. 1 shows a schematic representation of an example of a turbo machine.

By way of context, FIG. 1 shows an example of a gas turbine engine 60 in a sectional view, which illustrates the nature of components according to the present disclosure (for example rotor blades) and the environment in which they operate. The gas turbine engine 60 comprises, in flow series, an inlet 62, a compressor section 64, a combustion section 66 and a turbine section 68, which are generally arranged in flow series and generally in the direction of a longitudinal or rotational axis 70. The gas turbine engine 60 further comprises a shaft 72 which is rotatable about the rotational axis 70 and which extends longitudinally through the gas turbine engine 60. The rotational axis 70 is normally the rotational axis of an associated gas turbine engine. Hence any reference to "axial", "radial" and "circumferential" directions are with respect to the rotational axis 70.

The shaft 72 drivingly connects the turbine section 68 to the compressor section 64. In operation of the gas turbine engine 60, air 74, which is taken in through the air inlet 62 is compressed by the compressor section 64 and delivered to the combustion section or burner section 66. The burner section 66 comprises a burner plenum 76, one or more combustion chambers 78 defined by a double wall can 80 and at least one burner 82 fixed to each combustion chamber 78. The combustion chambers 78 and the burners 82 are located inside the burner plenum 76. The compressed air passing through the compressor section 64 enters a diffuser 84 and is discharged from the diffuser 84 into the burner plenum 76 from where a portion of the air enters the burner 82 and is mixed with a gaseous or liquid fuel. The air/fuel mixture is then burned and the combustion gas 86 or working gas from the combustion is channelled via a transition duct 88 to the turbine section 68.

The turbine section 68 may comprise a number of blade carrying discs 90 or turbine wheels attached to the shaft 72. In the example shown, the turbine section 68 comprises two discs 90 which each carry an annular array of turbine assemblies 12, which each comprises an aerofoil 14 embodied as a turbine blade 100. Turbine cascades 92 are disposed between the turbine blades 100. Each turbine cascade 92 carries an annular array of turbine assemblies 12, which each comprises an aerofoil 14 in the form of guiding vanes (i.e. stator vanes 96), which are fixed to a stator 94 of the gas turbine engine 60.

Figure 2:
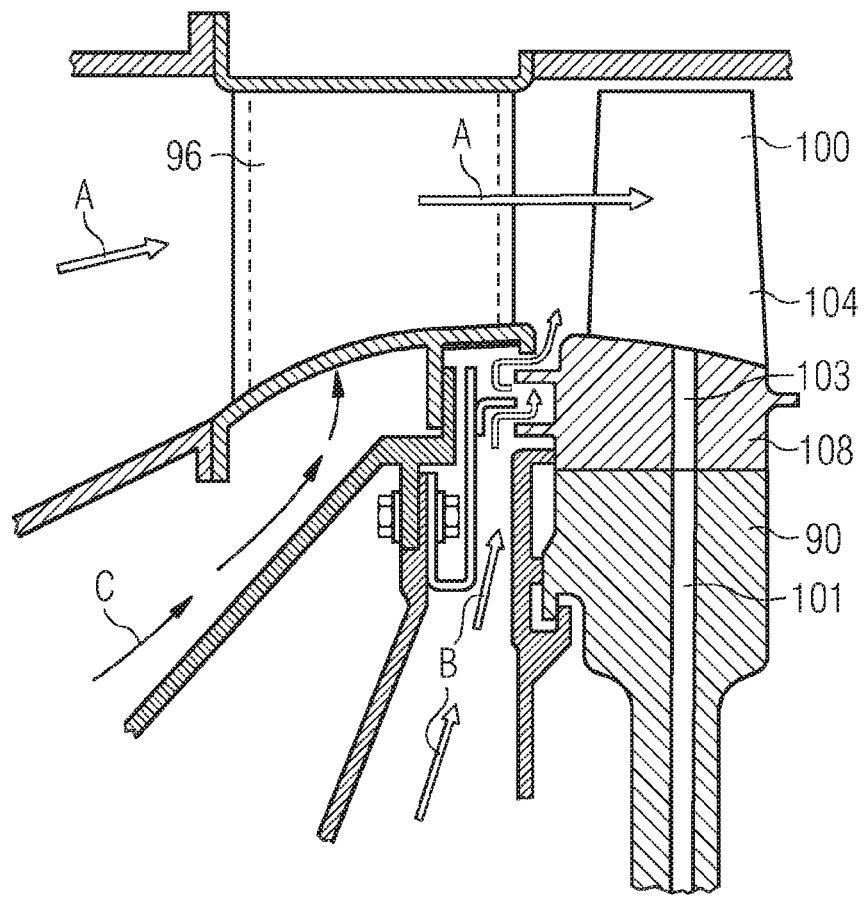
FIG. 2 shows an enlarged region of a section of a turbine of the turbo machine shown in FIG. 1.

FIG. 2 shows an enlarged view of a stator vane 96 and rotor blade 100. Arrows "A" indicate the direction of flow of combustion gas 86 past the aerofoils 96,100. Arrows "B" show air flow passages provided for sealing, and arrows "C" indicate cooling air flow paths for passing through the stator vanes 96. Cooling flow passages 101 may be provided in the rotor disc 90 which extend radially outwards to feed an air flow passage 103 in the rotor blade 100.

The combustion gas 86 from the combustion chamber 78 enters the turbine section 58 and drives the turbine blades 100 which in turn rotate the shaft 72 to drive the compressor. The guiding vanes 96 serve to optimise the angle of the combustion or working gas 86 on to the turbine blades.

Figure 3:
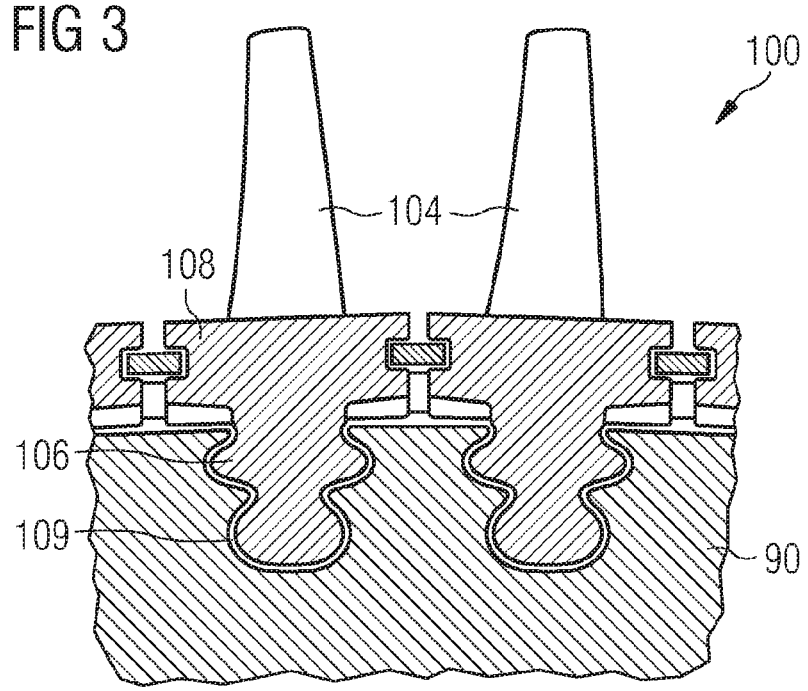
FIG. 3 shows an end view of the rotor blades shown in FIGS. 1, 2.

FIG. 3 shows a view of the rotor blades 100 looking upstream facing the flow "A" shown in FIG. 2.

Each rotor blade 100 comprises an aerofoil portion 104, a root portion 106 and a platform 108 from which the aerofoil extends.

The rotor blades 100 are fixed to the rotor disc 102 by means of their root portions 106, through which the flow passage 101 may extend. The root portions 106 have a shape that corresponds to notches (or grooves) 109 in the rotor disc 90, and are configured to prevent the rotor blade 100 from detaching from the rotor disc 102 in a radial direction as the rotor disc 102 spins.

Figure 4:
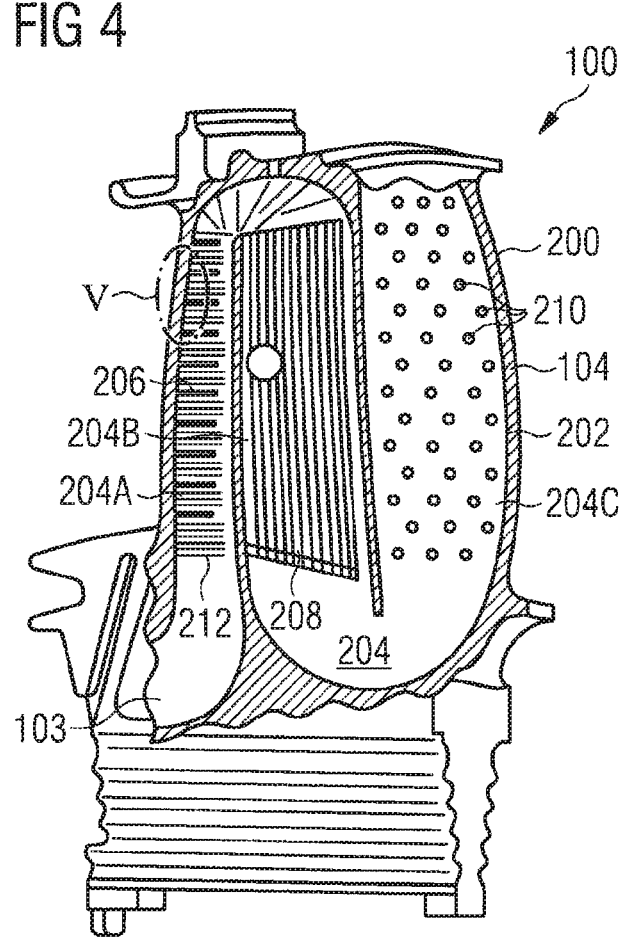
FIG. 4 shows a part sectional view of a rotor blade according to the present disclosure.

FIG. 4 shows a part sectional view of a component according to the present disclosure, and which may be manufactured by the method of the present disclosure. In this example the component is a rotor blade 100 as described above. The component 100 comprises a main body 104, provided in this example as the aerofoil portion 104. The main body 104 has a fluid inlet 103 which, as described above, in situ will be in flow communication with a cooling passage 101 or other fluid source.

Although the present example relates to a rotor blade, the component may be another fluid/air cooled component for a gas turbine engine. For example a nozzle guide vane or a turbine rotor in which the rotor blades are provided integrally with a rotor disc 90.

The inlet 103 may be provided as a single passage, or a plurality of passages. The component 104 further comprises a fluid outlet, or a plurality of fluid outlets 200. A cooling passage 204 extends between the fluid inlet 103 and fluid outlet 200.

In the present example the fluid outlet is provided along a trailing edge 202 of the aerofoil, for example as an elongate slit or plurality of openings. The fluid outlet may also be through a hole in the blade tip section.

Where the term fluid inlet and fluid outlet are used, this may be taken to mean a single inlet and/or outlet, or a plurality of inlets and/or a plurality of outlets. Hence a sub-divided inlet may feed the cooling passage 204 and/or a sub divided outlet may provide an exhaust path from the cooling passage 204.

In the example shown in FIG. 4 the cooling passage 204 is divided into a first section 204A and a second section 204B. The first section 204A and second section 204B extend between the fluid inlet 103 and fluid outlet 200. In the example shown the first section 204A and second section 204B are in series with each other between the fluid inlet 103 and fluid outlet 200. In the present example there is also provided a third section 204C. In the example shown the third section is in series with the first section and second section. Hence fluid (i.e. air) entering the flow passage 204 through the fluid inlet 103 will pass through the first section 204A, then the second section 204B and then the third section 204C before exiting the fluid outlet 200.

The terms "first section", "second section" and "third section" are intended to mean "different sections". In some of the examples shown the third section is located downstream of the second section, and the second section is located downstream of the first section in the cooling passage, in terms of direction of flow of cooling flow. However, in other examples the first, second and third sections may be arranged differently. For example, the first section may be downstream of the second section, and/or the third section may be immediately downstream of the first section.

In the example shown in FIG. 4, different macro cooling features (i.e. turbulators) are provided in each of the sections. The first section 204A comprises turbulators 206 which extend from a wall of the rotor blade, providing a flow restriction and increased surface area in the flow path. The second section 204B comprises a plurality of dividing walls 208 with spaces therebetween, which define flow passages and provide an increased surface area. The third section 204C comprises pedestals 210 to provide an increased surface area. Each of these macro cooling features are configured to increase surface area and promote turbulence and hence increase the amount of heat that will be transferred from the material of the rotor blade to the air passing therethrough.

In other examples different macro cooling features, or a different combination of the above described macro features may be provided. In other examples cooling passage may not comprise any macro cooling features.

The surface roughness (Ra) of at least one of the first section and second section is configured to be no less than about 7 μm but no more than about 15 μm. That is to say, at least part of the first section and/or second section comprise a surface roughness (Ra) no less than about 7 μm but no more than about 15 μm. Put another way, the surface roughness (Ra) of at least one region of at least one section of the cooling passage 204 is configured to be no less than about 7 μm but no more than about 15 μm. That is to say at least one region of at least one section of the cooling passage 204 is configured to have a predetermined surface roughness (Ra) no less than about 7 μm but no more than about 15 μm. Alternatively the predetermined surface roughness (Ra) may be no less than about 8 μm but no more than about 11 μm.

The surface roughness of the remaining areas of the cooling passage 204 may be no less than about 1.5 μm but no more than about 3.5 μm.

Hence the surface roughness of the second section may be no less than about 1.5 μm but no more than about 3.5 μm.

In other examples, the surface roughness of the first section and second section may be the same as one another.

Although in the present example the first section is provided immediately downstream of the fluid inlet 103, the first section of the cooling passage may be located further downstream the cooling passage. The predetermined surface roughness (i.e. in the desired range) may be provided over the entire cooling passage 204 or to selected regions of the cooling passage 204. The predetermined surface roughness (i.e. in the desired range) may be provided on all of a cooling passage section, as shown in the FIG. 4, or a subset (i.e. region) of a section of the flow passage. Hence for example the second section may be provided with the predetermined surface roughness in the desired range, and the first section and third section may have a different surface roughness to the second section. The surface roughness of the first section and second section may be different to one another.

Although different means of achieving the surface roughness may be provided, in the present example the surface roughness is defined by a plurality of spaced apart micro ribs 212 which extend at least part of the way across the cooling passage 204, and in particular across the first section 204A of the cooling passage 204. The micro ribs may have a height and width of no less than 0.025 mm and no greater than 0.05 mm. Alternatively the micro ribs may have a height and width of no less than 0.025 mm and no greater than 0.1 mm. This is sufficient to create the surface roughness (Ra) of no less than about 7 μm but no more than about 15 μm.

The micro ribs 212 may be polygonal in cross section. The micro ribs 212 may be square in cross section.

Alternatively, or additionally, the macro ribs (turbulators) 206 may be polygonal in cross section, for example square.

The macro ribs may have a height and width of no less than 0.5 mm and no greater than 5.0 mm.

At least one micro rib may be provided between adjacent macro ribs.

The macro ribs 206 may be parallel with the micro ribs 212. The macro ribs may be parallel to one another. The micro ribs may be parallel to one another. At least one of the micro ribs may be angled relative to another one of the micro ribs. For example, the micro ribs may be provided 20° to 70° to the flow direction. The macro ribs and micro ribs may be provided at an angle to one another. That is to say the macro ribs may be provided at an angle to the micro ribs.

FIGS. 6 to 10 show different arrangements according to the present disclosure. It will be appreciated that cooling passages through turbine blades may be provided in a great number of different ways, and that the provision of a predetermined surface roughness in the cooling passage may be applied regardless of the geometry of the cooling passage.

FIGS. 6 to 9 show variations on the arrangements shown in FIG. 4, with FIG. 6 showing the first section 204A having the predetermined surface roughness (i.e. Ra provided as no less than about 7 μm but no more than about 15 μm). In the examples shown the surface roughness of the remaining sections of the cooling passage have a different surface roughness to that of the first section 204A. In FIG. 6 the surface roughness is provided by micro ribs which are perpendicular to the direction of flow through the first section 204A. In FIG. 7 micro ribs are provided an angle to the direction of flow in the first section 204A.

It may be advantageous to provide the predetermined surface roughness in the first section of the cooling passage 204, and to have the surface roughness in the remaining parts of the cooling passage to be configured with a lower surface roughness than in the first section.

The predetermined surface roughness may be provided in a region of the cooling passage 204 which extends through a region of the component which will, in use, require most cooling (for example, the leading edge region, as shown in FIGS. 4 to 10), with the surface roughness in the remainder of the cooling passage being provided with a surface roughness less than that having the predetermined surface roughness.

With such a configuration, in use, the majority of the cooling effect will be in the region having the predetermined surface roughness.

Thus when the component is a rotor blade, and hence the leading edge of the rotor blade will be the region requiring most cooling, it may be advantageous to provide the section of the cooling passage passing through the leading edge region with the predetermined surface roughness, as shown in FIGS. 4 to 10.

In FIG. 8 the first section 204A and second section 204B of the cooling passage are provided with micro ribs which extend perpendicular to the flow of air through them. Alternatively, or additionally, the micro ribs may be provided at an angle to the direction of flow. The surface roughness may be different in different sections or sub sections of the cooling passage 204. Hence in one section of the cooling flow passage the surface roughness may be configured to be no less than about 7 μm but no more than about 15 μm, and in another section the surface roughness has a different value (for example less than 7 μm or greater than 15 μm), and in the third section the surface roughness is less than in either of the other sections.

In the example of FIG. 8 the surface roughness of two sections (first section 204A and the second section 204B) are provided with micro ribs to define the surface roughness, whereas the third section 204C is not provided with micro ribs, although is provided with pedestals 210 as taught in the example of FIG. 4. Conversely, in the example of FIG. 9 the predetermined surface roughness is different in all three of the sections 204A, 204B, 204C with a different pattern of micro ribs in each section. For example in the first section the micro ribs are an angle to the direction flow, in the second section the micro ribs are provided in a crosshatch form (i.e. some of the micro ribs being at an angle to some of the other micro ribs) and in the third section the micro ribs are provided in a zig zag form. Hence the micro ribs or surface finish may be provided in many ways to provide a predetermined surface roughness.

Figure 10:
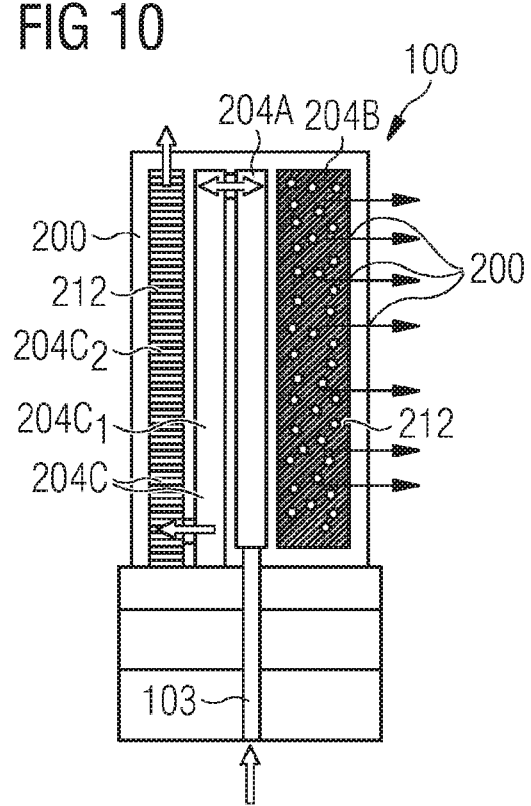

FIG. 10 shows a further arrangement in which the cooling passage is divided into three sections, with a first section 204A being immediately downstream of a fluid inlet 103 and the flow being divided between a second section 204B and a third section 204C, where the flow passage through the second section 204B and third section 204C are arranged in parallel to the flow passage in the first section 204A. Hence the second section 204B is adjacent the trailing edge of the rotor blade, and the third section 204C is adjacent the leading edge of the rotor blade.

The second section 204B has a fluid outlet 200 as well as being provided with micro ribs to define a predetermined surface roughness, for example no less than about 7 μm but no more than about 15 μm, with the micro ribs being provided at an angle to the longitudinal direction of the second section 204B. The third section 204C has a first sub section 204C1 in flow communication with a second sub section 204C2 to form a "U" shape, the third section 204C being between the first section 204A and a leading edge of the rotor blade. The second sub section 204C2 is provided with the predetermined surface roughness whereas the first sub section 204C1 is relatively smooth compared to the second sub section.

The provision of a region of predetermined surface roughness (e.g. with a value of Ra in the range 7 μm to 15 μm, or in the range of in the range 8 μm to 11 μm) enhances the heat transfer from that region on which is it provided. The rough surface can be used in isolation or in combination with conventional cooling methods to further enhance the heat transfer. That is to say, the predetermined surface roughness may be provided instead of macro cooling features, or in addition to macro cooling features.

The range of 7 μm to 15 μm has been determined to provide a surprising effect. Below this range there is no appreciable enhanced heat transfer coefficient (i.e. cooling effect), and above this range there is no appreciable change in heat transfer coefficient of the material, although pressure losses above this range become significant, which impedes flow.

Conventionally surface roughness of cooling passages is provided in the range of 1.5 μm to no more than about 3.5 μm.

Figure 11:
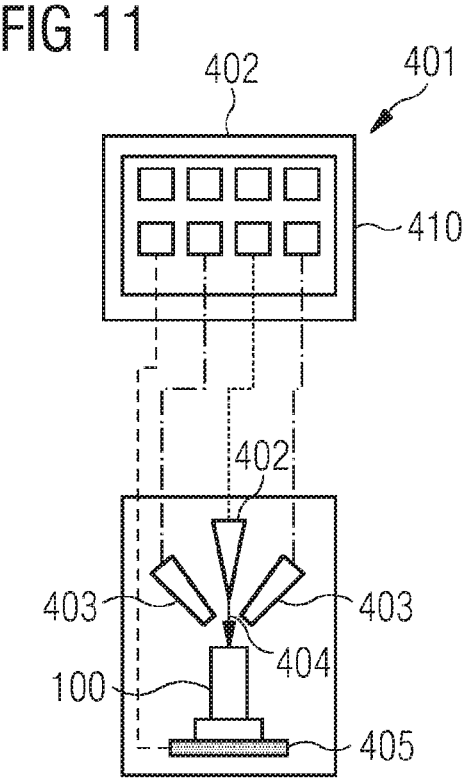
FIG. 11 depicts an exemplary laser sintering device for manufacturing a component according to the present disclosure.

FIG. 11 shows an example of a laser sintering apparatus which may be operated to perform a method of manufacturing of a component for a turbo machine according to the present disclosure. That is to say the device shown is a laser sintering apparatus for an additive manufacturing process which may be used to produce a component according to the present disclosure.

Laser sintering is a popular additive manufacturing process that is used to manufacture 3-D objects in a layered manner from powdered material. The objects can be either metallic or nonmetallic. Three-dimensional (3D) objects having extremely complicated profiles and contours, such as turbomachine components are capable of being manufactured using laser sintering techniques in a controlled and a precise manner.

During the process of laser sintering, the powdered material of the desired 3-D object is fed layer after layer (layer of a certain thickness, for example, 20 μm) from a feeder unit to a base plate of a laser sintering device. Based on a 3D profile of the object being manufactured, especially the profile that corresponds to that particular layer of the object, the corresponding particles of the powdered material which constitute that particular layer are selectively heated using a high power laser, until the particles are molten. The molten particles adhere to each other, and thereby a certain layer of the object is manufactured. Thereafter, the base plate is lowered by a height, wherein the height usually corresponds to a chosen layer thickness of the powdered material and the aforementioned laser sintering process steps are repeated for manufacturing a next layer of the object, which corresponds to an immediate upper layer of the object. The aforementioned process steps are repeated for manufacturing subsequent top layers of the object, thereby resulting in the manufacture of the object.

The laser sintering device 401 of FIG. 11 comprises a laser unit 402 for generating a laser beam 404, a base plate 405 whereon the component 100 is manufactured by laser sintering, and a powder feeder unit 403 for feeding powdered material to the working space.

The device 401 is shown purely diagrammatically, by way of example only, and a method according to the present disclosure may be worked by any suitable configuration of laser sintering device, whether physically resembling the arrangement of FIG. 11 or different. The principle of operation for any device according to the present disclosure will be the same, even if the arrangement of the individual components differs from that shown in FIG. 11.

The powder feeder unit 403 may be configured to provide the powdered material to the base plate 405 in a layered manner. The laser unit 402 is configured to generate the laser beam 404, direct the laser beam 404 towards the particular layer of the powdered material lying on the base plate 405, and also to sinter the layer of the powdered material, wherewith a first sintered layer of the component 100 is obtained. Thereafter, the base plate 405 is lowered by a magnitude that is typically equal to a thickness of the layer of the powdered material, a next layer of the powdered material (not depicted) is disposed on the first sintered layer, the laser beam 404 is again generated by the laser unit 402, the laser beam 404 is directed towards the next layer of the powdered material disposed on the first sintered layer, and the next layer of the powdered material is sintered, wherewith a second sintered layer of the component 100 is obtained. The steps are repeated for obtaining subsequent upper layers of the component 100 until completion.

A control unit 410 is depicted for controlling the operation of the features of the sintering device. A control line is shown for each of the laser, powder feeder and base plate, although the links are purely diagrammatic, illustrating that the function of each of the laser, powder feeder and base plate may be controlled separately.

The method of manufacture, that is to say the method of operation of the laser sintering device, comprises the steps of manufacturing the component 100 using a laser sintering additive manufacture process, and controlling the laser sintering additive manufacture process dependent on a control parameter such that the first section 204A of the cooling passage 204 has a first predetermined roughness; and the second section 204B has a second predetermined surface roughness. Hence the first predetermined surface roughness (Ra) may be no less than about 7 μm but no more than about 15 μm.

That is to say the method may comprise the steps of manufacturing the component 100 using a laser sintering additive manufacture apparatus, controlling the laser sintering additive manufacture apparatus dependent on a control parameter such that the first section 204A has a first predetermined roughness, and the second section 204B has a second predetermined surface roughness, where the first predetermined surface roughness (Ra) may be no less than about 7 μm but no more than about 15 μm.

The laser sintering additive manufacturing process may be defined by a plurality of control parameters, with each of the control parameters being controlled to produce the predetermined surface roughness in each section of the cooling passage 204 of the component 100. That is to say one control parameter of the apparatus may be controlled to produce the predetermined surface roughness in the chosen section 204A, 204B, 204C of the cooling passage, or more than one control parameter may be controlled at the same time to produce the predetermined surface roughness in each of the sections 204A, 204B, 204C of the cooling passage, or just one of the sections of the cooling passages, or just part of a (i.e. a region of) section of one or more of the cooling passages 204A, 204B, 204C.

The different control parameters may be tracking speed of the sintering laser, intensity of the sintering laser, spot size of the sintering laser and/or grain size of sintering material.

Tracking speed corresponds to exposure time, i.e. the length of time that the laser has to deliver heat to the sintering material. Hence the method comprises the step of controlling the tracking speed to produce the required predetermined surface roughness in each of the sections of the cooling passage. Hence a faster tracking speed may be used in the first region than in the second region to produce a different surface roughness in the first region to the second region. A faster laser speed will generally result in a coarse surface finish, and a slow speed a refined/smoother finish.

Laser intensity related to the amount of energy per unit area delivered by the laser to the sintering material. Hence the method comprises the step of controlling the laser intensity to produce the required predetermined surface roughness in each of the sections of the cooling passage. The method may comprise the step of controlling the laser intensity to have a lower intensity in the first section 204A than in the second section 204B, to thereby produce the different predetermined surface roughness in the first section and second section. A higher intensity will increase the heat input to the sintering material, so increasing the region melted and giving a smooth surface. Hence the laser intensity may advantageously be lower in the first region than in the second region to increase the surface roughness in the first region relative to the second region.

The laser spot size is the cross sectional area of the laser in the region where it coincides with the surface of the sintering material. The method may comprise the step of controlling the laser spot size to produce the predetermined surface roughness in each of the first and second sections. Hence the method may comprise the step of controlling the laser spot size to be larger in the first region than in the second region to thereby produce different surface roughness in the first section and the second section. This is because a larger laser spot size, without increasing the laser intensity, will result in a less heat input per unit area so resulting in a coarse surface.

The control parameter may be a function of grain size of sintering material, and hence the method may comprise the step of controlling the supply of the sintering material to produce the predetermined surface roughness in each of the first section and second section of the cooling passage 204. Hence the method may comprise the step of controlling the supply of sintering material to deliver a sintering material having a larger grain size in the first region than in the second region to thereby produce the different surface roughness in the first region and the second region. A small powder grain size will result in a finer finish, and a larger powder size will result in a coarse finish.

The additive manufacturing apparatus may be controlled to produce a predetermined surface roughness in at least one of the first section and second sections defined by a plurality of spaced apart micro ribs (for example as described with reference to the component 100 in FIGS. 4 to 10) which extend at least part of the way across the cooling passage 204. The micro ribs may have a height and a width of no less than 0.025 mm and no greater than 0.05 mm. Alternatively the micro ribs may have a height and a width of no less than 0.025 mm and no greater than 0.1 mm.

Figure 5:
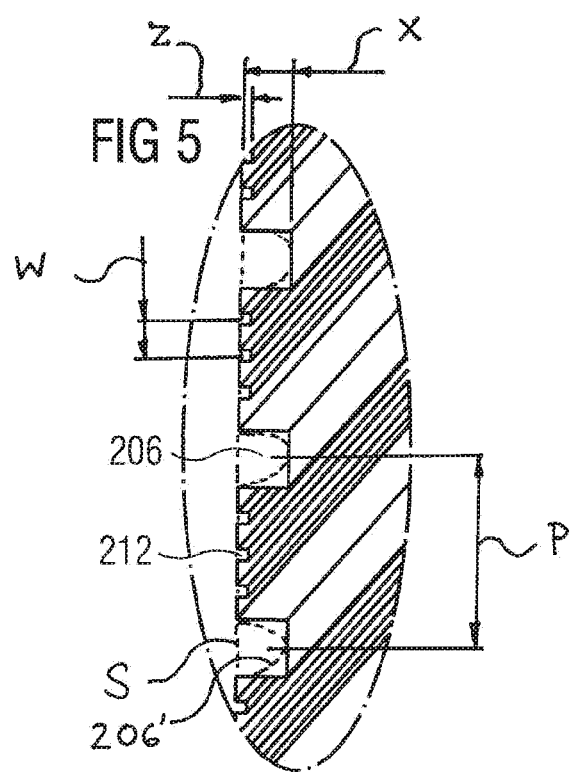
FIG. 5 shows an enlarged region of the rotor blade of FIG. 4.

As shown in FIG. 5, the micro ribs 212 may be formed by the process to be polygonal in cross section, for example square in cross section.

The additive manufacturing apparatus may be controlled to produce a macro rib 206, or macro ribs, which extend across the cooling passage 204, wherein the macro ribs may have a height and width of no less than 0.5 mm and no greater than 5 mm, the at least one micro rib 212 being provided between adjacent macro ribs 206.

Put another way, the manufacturing method may include the steps of controlling the laser sintering device to produce a component 100 with the features as described with reference to FIGS. 4 to 10.

The method may further comprise the steps of controlling the laser sintering additive manufacture process dependent on the control parameter such that the predetermined first surface roughness of the first section 204A is the same as the predetermined second surface roughness of the second section 204B. Put another way, the method may comprise the step of controlling the laser sintering additive manufacture apparatus to form the predetermined first surface roughness of the first section 204A and the predetermined second surface roughness of the second section 204B to have the same value.

Alternatively the method may comprise the step of controlling the laser sintering additive manufacture process dependent on the control parameter such that the predetermined first surface roughness of the first section 204A is different to the predetermined second surface roughness of the second section 204B. Put another way the method may comprise the step of controlling the laser sintering additive manufacture apparatus to form the predetermined first surface roughness of the first section 204A and the predetermined second surface roughness of the second section 204B to have a different value.

The method may further comprise the step of controlling the laser sintering additive manufacture apparatus and process dependent on the control parameter such that the predetermined second surface roughness of the second section (204B) is no less than about 1.5 µm but no more than about 3.5 µm.

Hence there is provided a method of manufacturing using an additive manufacturing technique to directly produce the desired structure of cooling passages of a component, as hereinbefore described. The laser sintering method is advantageous as it directly produces the component as required, without necessarily the requirement for further machining after production.

The method allows for manufacture of a component for a turbo machine which may be provided as a rotor blade or nozzle guide vane, with a cooling passage, a region of the cooling passage having a predetermined surface roughness in the range of about 7 µm but no more than about 15 µm to thereby enhance surface cooling in that region.

The regions of predetermined surface roughness provide enhanced internal cooling to ensure that the metal temperatures are low enough to prevent excessive oxidation, and provide an adequate creep life. By having a rough surface to the internal cooling passages the heat transfer can be significantly enhanced thus allowing greater engine efficiency, or a longer service life.

Provision of predetermined roughness according to the present disclosure is also advantageous as it can be use in addition with conventional turbulators (macro ribs) or impingement jets to further enhance the heat transfer. Thus the internal cooling systems of gas turbine components can be increased without change to the amount of air used for cooling.

The increase of internal heat transfer to cooled gas turbine components results in cooler component operating temperatures allowing greater service life. It may also result in less cooling air being used for the same component temperatures giving greater engine power for the same fuel consumption. It may also result in higher engine operating temperatures for the same cooling flow leading to higher engine efficiency.

FIG. 5 shows another embodiment of the component 100 where the macro ribs 206 are formed to have a height X and the micro ribs 212 are formed to have a height Z and height Z is between 0.05X and 0.1X. The heights of the macro ribs 206 and the micro ribs 212 are from a nominal surface, shown by dotted line S, of the component 100. Further, the macro ribs 206 are formed to have a pitch P between 6X and 10X, and the micro ribs 212 are formed to have a pitch W between 6Z and 10Z. The pitch or spacing is determined between alike positions on adjacent and corresponding alike ribs.

At least one and advantageously two micro ribs (212) are formed between adjacent macro ribs (206). In other words and considering the airflow direction, the term adjacent means a first macro rib and then the next macro rib. So adjacent macro ribs means there are no other macro ribs in between the two related macro ribs. However, micro ribs are located between the adjacent (i.e. first and second) macro ribs. As can be seen in FIG. 5, there are three micro ribs 212 in between each adjacent pair of macro ribs 206. In other embodiments, the number of micro ribs 212 between adjacent pairs of macro ribs may vary, for example, 3 micro ribs 212 in a first gap between adjacent macro ribs 206 and then 4 micro ribs 212 between the next two adjacent macro ribs 206. Furthermore, the pitch or spacing of the macro ribs 206 and/or the micro ribs 212 do not need to be constant along the first section 204A and/or second section 204B.

Although the macro ribs 206 and micro ribs 212 are shown having sharp or right angled edges, it is possible that both ribs 206, 212 have a more rounded profile as show for example by the dashed line 206'—the micro ribs may be similarly shaped 212'.

It has been found that the present design of macro ribs 206 and micro ribs 212 are particularly effective for heat transfer and depending on application and arrangement can increase heat transfer by 20% to 70% over a conventional turbulators or ribs alone. The macro ribs 206 create vortices in the coolant flow and the vortices interact with the micro ribs 212 enhancing heat transfer.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of manufacturing a component for a turbo machine, the component comprising: a main body having a fluid inlet and fluid outlet; a cooling passage extending between a fluid inlet and a fluid outlet; the cooling passage divided into a first section and a second section which extend between the fluid inlet and fluid outlet; the method comprising:

manufacturing the component using a laser sintering additive manufacture apparatus;

controlling the laser sintering additive manufacture apparatus dependent on a control parameter such that the first section has a first predetermined surface roughness; and the second section has a second predetermined surface roughness;

wherein the additive manufacture apparatus is controlled to produce the predetermined surface roughness in at least one of the first section and second section defined by a plurality of spaced apart micro ribs which extend at least part of the way across the cooling passage, wherein the first section of the cooling passage is fluidly coupled to the fluid inlet to receive a flow of cooling fluid, wherein the first section of the cooling passage comprises a plurality of discrete macro ribs which extend across the cooling passage, and wherein the second section of the cooling passage comprises a plurality of spaced apart dividing walls, which define flow passages in fluid communication with the first section of the cooling passage, wherein at least one micro rib some of the plurality of spaced apart micro ribs being formed between adjacent macro ribs of the discrete macro ribs in the first section of the cooling passage and in the flow passages defined by the spaced apart dividing walls in the second section of the cooling passage, wherein the discrete macro ribs in the first section of the cooling passage and the dividing walls in the second section of the cooling passage each respectively operate as turbulators to form respective vortices in the cooling flow that flows in the cooling passage, wherein the predetermined surface roughness defined by the plurality of spaced apart micro ribs and the plurality of spaced apart dividing walls in said at least one of the first section and the second section of the cooling passage, in operation, increases heat transfer due to interaction of the vortices in the cooling flow with surfaces having the predetermined surface roughness.

2. The method of manufacturing a component for a turbo machine as claimed in claim 1, wherein the macro ribs are formed to have a height X and the micro ribs are formed to have a height Z and height Z is between 0.05X and 0.1X.

3. The method of manufacturing a component for a turbo machine as claimed in claim 2, wherein the macro ribs are formed to have a pitch P between 6X and 10X, and the micro ribs are formed to have a pitch W between 6Z and 10Z.

4. The method of manufacturing a component for a turbo machine as claimed in claim 1, wherein the first predetermined surface roughness is no less than 7 µm but no more than 15 µm.

5. The method of manufacturing a component for a turbo machine as claimed in claim 1, further comprising:

controlling the laser sintering additive manufacture apparatus to form the predetermined first surface roughness of the first section and the predetermined second surface roughness of the second section to have the same value.

6. The method of manufacturing a component as claimed in claim 1, further comprising:

controlling the laser sintering additive manufacture apparatus to form the predetermined first surface roughness of the first section and the predetermined second surface roughness of the second section to have a different value.

7. The method of manufacturing a component as claimed in claim 6, further comprising:

controlling the laser sintering additive manufacture apparatus such that the predetermined second surface roughness of the second section is no less than 1.5 µm but no more than 3.5 µm.

8. The method of manufacturing a component as claimed in claim 1, wherein the control parameter is tracking speed of the sintering laser.

9. The method of manufacturing a component as claimed in claim 1, wherein the control parameter is intensity of the sintering laser.

10. The method of manufacturing a component as claimed in claim 1, wherein the control parameter is spot size of the sintering laser.

11. The method of manufacturing a component as claimed in claim 1, wherein the control parameter is grain size of sintering material, the method further comprising controlling the supply of the sintering material.

12. The method of manufacturing a component as claimed in claim 1, wherein the micro ribs have a height and width of no less than 0.025 mm and no greater than 0.1 mm.

13. The method of manufacturing a component as claimed in claim 12, wherein the micro ribs are formed to be polygonal in cross section.

14. The method of manufacturing a component as claimed in claim 12, wherein the macro ribs are formed to have a height and width of no less than 0.5 mm and no greater than 5 mm.

15. The method of manufacturing a component as claimed in claim 14, wherein the macro ribs and micro ribs are formed to be parallel with one another.

16. The method of manufacturing a component as claimed in claim 14, wherein the macro ribs and micro ribs are formed to be at an angle to one another.

17. The method of manufacturing a component as claimed in claim 1, wherein the component formed by the apparatus is one of: a rotor blade, stator vane, or rotor disc.

18. The method of manufacturing a component as claimed in claim 1, wherein the cooling passage has a third section having a plurality of pedestals that operate as turbulators to form further vortices in the cooling flow that flows in the third section of the cooling passage before the cooling flow exits the cooling passage through the fluid outlet, wherein a subsection of the third section has a predetermined surface roughness.

19. A method of manufacturing a component for a turbo machine, the component comprising: a main body having a fluid inlet and fluid outlet; a cooling passage extending between a fluid inlet and a fluid outlet; the cooling passage divided into a first section and a second section which extend between the fluid inlet and fluid outlet; the method comprising:

manufacturing the component using a laser sintering additive manufacture apparatus;

controlling the laser sintering additive manufacture apparatus dependent on a control parameter such that the first section has a first predetermined surface roughness, and the second section has a second predetermined surface roughness, wherein the first predetermined surface roughness is greater relative to the second predetermined surface roughness;

wherein the additive manufacture apparatus is controlled to produce the second predetermined surface roughness in at least one of the first section and second section by way of a plurality of spaced apart micro ribs which extend at least part of the way across the cooling passage, wherein the first section of the cooling passage is fluidly coupled to the fluid inlet to receive a flow of cooling fluid, wherein the first section of the cooling passage comprises a plurality of discrete macro ribs which extend across the cooling passage, and wherein the second section of the cooling passage comprises a plurality of spaced apart dividing walls, which define flow passages in fluid communication with and downstream from the first section of the cooling passage, wherein at least some of the plurality of spaced apart micro ribs being formed between adjacent macro ribs of the discrete macro ribs in the first section of the cooling passage and in the flow passages defined by the spaced apart dividing walls in the second section of the cooling passage, wherein the discrete macro ribs in the first section of the cooling passage and the dividing walls in the second section of the cooling passage each respectively operate as turbulators to form respective vortices in the cooling flow that flows in the cooling passage, wherein the predetermined surface roughness defined by the plurality of spaced apart micro ribs and the plurality of spaced apart dividing walls in said at least one of the first section and the second section of the cooling passage, in operation, increases heat transfer due to interaction of the vortices in the cooling flow with surfaces having the predetermined surface roughness.

20. A method of manufacturing a component for a turbo machine, the component comprising: a main body having a fluid inlet and fluid outlet; a cooling passage extending between a fluid inlet and a fluid outlet; the cooling passage divided into a first section and a second section which extend between the fluid inlet and fluid outlet; the method comprising:

manufacturing the component using a laser sintering additive manufacture apparatus;

controlling the laser sintering additive manufacture apparatus dependent on a control parameter such that the first section has a first predetermined surface roughness; and the second section has a second predetermined surface roughness, wherein the first predetermined surface roughness is no less than 7 μm but no more than 15 μm and wherein the second predetermined surface roughness is no less than 1.5 μm but no more than 3.5 μm, wherein the additive manufacture apparatus is controlled to produce the second predetermined surface roughness in at least one of the first section and second section by way of a plurality of spaced apart micro ribs which extend at least part of the way across the cooling passage, wherein the first section of the cooling passage is fluidly coupled to the fluid inlet to receive a flow of cooling fluid, wherein the first section of the cooling passage comprises a plurality of discrete macro ribs which extend across the cooling passage, wherein the second section of the cooling passage comprises a plurality of spaced apart dividing walls, which define flow passages in fluid communication with and downstream from the first section of the cooling passage, wherein at least some of the plurality of spaced apart micro ribs being formed between adjacent macro ribs of the discrete macro ribs in the first section of the cooling passage and in the flow passages defined by the spaced apart dividing walls in the second section of the cooling passage, wherein the discrete macro ribs in the first section of the cooling passage and the dividing walls in the second section of the cooling passage each respectively operate as turbulators to form respective vortices in the cooling flow that flows in the cooling passage, wherein the predetermined surface roughness defined by the plurality of spaced apart micro ribs and the plurality of spaced apart dividing walls in in said at least one of the first section and the second section of the cooling passage, in operation, increases heat transfer due to interaction of the vortices in the cooling flow with surfaces having the predetermined surface roughness.

* * * * *